United States Patent [19]

Velenyi et al.

[11] 4,349,462

[45] Sep. 14, 1982

[54] CATALYTIC MATERIAL

[75] Inventors: Louis J. Velenyi, Lyndhurst; Serge R. Dolhyj, Parma, both of Ohio

[73] Assignee: SOHIO, Ohio

[21] Appl. No.: 219,781

[22] Filed: Dec. 24, 1980

[51] Int. Cl.$^3$ .................. B01J 23/70; B01J 21/04; B01J 21/12

[52] U.S. Cl. .................. 252/455 R; 252/455 Z; 252/459; 252/466 J; 518/713

[58] Field of Search ............... 252/459, 455 R, 466 J; 518/713

[56] References Cited

U.S. PATENT DOCUMENTS

| | | | |
|---|---|---|---|
| 2,786,817 | 3/1957 | Rottig et al. | 252/459 X |
| 3,931,049 | 1/1976 | Ford et al. | 252/466 J |
| 3,997,477 | 12/1976 | Takeuchi | 252/466 J |
| 3,997,582 | 12/1976 | Khera | 252/466 J |
| 4,024,075 | 5/1977 | Russ et al. | 252/466 J |
| 4,077,912 | 3/1978 | Dolhyj et al. | 252/455 R |
| 4,146,503 | 3/1979 | Vogt et al. | 518/713 X |
| 4,233,187 | 11/1980 | Alwood et al. | 252/466 J |
| 4,252,689 | 2/1981 | Miya | 252/466 J |

*Primary Examiner*—Carl F. Dees
*Attorney, Agent, or Firm*—Salvatore P. Pace; Herbert D. Knudsen; Larry W. Evans

[57] ABSTRACT

A fixed-bed catalytic material comprises iron impregnated Alundum carrying a coating of copper oxide on its outside surfaces. By means of the coating, the growth of carbon fibers as a result of the disproportionation of carbon monoxide is restricted to the interior surfaces of the catalyst particles.

7 Claims, No Drawings

CATALYTIC MATERIAL

BACKGROUND OF THE INVENTION

Belgian Pat. No. 869,185, issued Jan. 22, 1979 (corresponding to U.S.S.N. 817,647, filed July 21, 1977, now abandoned), describes a novel catalytic material comprising carbon fibers containing small nodules of iron or another Group VIII metal. This material is formed by contacting the Group VIII metal with a mixture of carbon monoxide and hydrogen at elevated temperature to cause deposition of carbon through the disproportionation of carbon monoxide. When the material so formed is contacted with hydrogen at elevated temperature, the carbon in the material reacts with the hydrogen to form methane. Repeated cycling between carbon deposition and methanation causes the catalytic material to exhibit high activity, i.e. high carbon deposition rates and high methanation rates.

In addition to very high catalytic activity, this material exhibits other unusual properties. For example, the material undergoes drastic changes in volume between the carbon deposition the methanation steps. Thus, it has been found that the volume of the material at the end of a carbon deposition step can be as much as 20 times as great as the volume at the end of a methanation step. Also, it has been found that repeated carbon deposition/methanation cycling causes gradual pulverization of the Group VIII metal on which the carbon fibers are grown. Also, the carbon fibers, especially when grown from such pulverized metal can exhibit extremely great expansive forces. For example, in one instance a stainless steel laboratory reactor was actually split open by the carbon fibers grown therein when the volume of the carbon fibers exceeded the internal volume of the reactor.

Because of the high catalytic activity of this material, it has been proposed to use this material for the production of high BTU gas from coal. This would be accomplished by burning the coal to produce producer gas and reacting the carbon monoxide in the producer gas in accordance with the above technique to produce methane. Unfortunately, the unusual properties of this material make it difficult or impossible to handle in conventional gas/solid contacting apparatus such as fixed or fluid-bed reactors wherein a bed of the solid is continuously contacted with a gas flowing therethrough.

For example, in fixed-bed operation, destruction of the reactor by growing too much carbon fibers is always a possibility. Also, the powdery residue produced by repeated carbon deposition/methanation cycles tends to collect together and on subsequent carbon deposition steps the carbon/metal mass produced agglomerates and plugs the reactor inlets and outlets.

In fluid-bed operation, it is necessary that the solid being contacted has a relatively specific particle size distribution and density. The vast changes in volume as well as density of the material as well as the fragile nature of the carbon fibers makes the material totally unsuitable for fluid-bed operation.

Accordingly, it is an object of the present invention to provide a new catalytic material which is also capable of catalyzing carbon deposition and methanation reactions with high catalytic activity but which also has a combination of physical properties making it amenable for use in a conventional fixed-bed reactor.

SUMMARY OF THE INVENTION

This and other objects are accomplished by the present invention which is based on the discovery that a dimensionally stable particulate material ideally suited for use in a fixed-bed reactor and capable of catalyzing carbon deposition and carbon methanation can be produced by impregnating a Group VIII metal into a conventional porous fixed-bed catalyst support material and thereafter coating the outside surfaces of the support with a material which prevents the growth of carbon fibers.

Thus, the present invention provides a catalytic material comprising a particulate fixed-bed support material, the pore surfaces of the support material being coated with a Group VIII metal, the outside surfaces of the support material being coated with a powdery carbon whisker preventing material.

DETAILED DESCRIPTION

The inventive catalytic material is composed of a porous fixed-bed support material impregnated with iron or other Group VIII metal so that the metal is present in the inside surfaces of the particle support, that is the pore surfaces. The outside surfaces of the support carry a coating of a material such as copper oxide which will not support the growth of carbon fibers.

Support Material

Porous particulate catalyst support materials for use in fixed-bed catalysts are well known. Examples of such materials are silica, alumina, silica/alumina (Alundum), zirconia, titania, hafnia, silicon carbide, boron phosphate, diatomaceous earth, pumice and so forth. For use in a fixed-bed, these materials will usually have a diameter of at least about 20 microns. Normally, fixed-bed support materials have particle sizes on the order of 1/32 to ½, more normally 1/16 to ¼ inch in diameter. Any such conventional fixed-bed support material can be used in accordance with the present invention provided that it is porous.

The porous fixed-bed support of the invention carries a Group VIII metal on its inside surfaces. Iron is the preferred Group VIII metal although cobalt, nickel or any of the other Group VIII can be employed.

The amount of Group VIII metal in the support can vary widely. Metal loadings on the order of 1 to 30%, preferably 10 to 20%, more preferably about 15% are useful.

The Group VIII metal can be deposited into the pores of the porous support by any of the well known techniques for accomplishing such impregnations. Normally, this is accomplished by impregnating the porous support with a solution containing the Group VIII metal or a compound thereof, drying, and if necessary heat treating in one or more steps with appropriate atmospheres to recover the metal in elemental form. For example, the preferred technique is to impregnate the support with an aqueous solution of iron or other Group VIII metal nitrate, dry the support, heat the support in air at elevated temperature to decompose the nitrate and produce metal oxide and thereafter heat the support in a reducing gas such as hydrogen to reduce the metal oxide to elemental form. Forming catalysts comprising a porous support carrying the various elements on the pore surfaces of the support in elemental form is well known and those skilled in the art should have no difficulty in forming the Group VIII metal impregnated porous fixed-bed supports of the present invention.

In accordance with the present invention, the fixed-bed porous support carrying a Group VIII metal on its pore surfaces is provided with a coating of a material which prevents the growth of carbon fibers on the outside surfaces of the support particles through carbon monoxide disproportionation (hereinafter referred to as "growth preventive material"). Examples of such growth preventive materials are copper oxide, copper metal, aluminum oxide and aluminum metal. Other materials which will prevent the growth of carbon fibers can also be employed.

The impregnated support particles of the invention are provided with a growth preventive coating by the technique described in commonly assigned U.S. Pat. No. 4,077,912, the disclosure of which is incorporated herein by reference. Basically, this technique involves gently agitating a mixture of the support particles and a fine powder of the coating material, the support having been previously wetted with a liquid having a relatively high degree of attraction for the powder coating. So long as the amount of liquid used for wetting the support is enough so that some liquid is adsorbed on the support but not enough so that the particle is wet to the touch (i.e. the particles should not have the appearance of liquid on their outer surfaces) then an adherent coating of the powdery material will form on the particle surfaces. In accordance with the invention, it has been found that there is sufficient gas permeability through a powdery growth preventive coating to allow the carbon deposition and methanation reactions to occur on the interior surfaces of the Group VIII element impregnated support. Incidentally, it has been determined that materials other than oxides (such as metals in elemental form and other compounds) can be used to form powdery coatings by the technique described in the above-noted U.S. Pat. No. 4,077,912.

The amount of coating on the fixed-bed support particles can vary widely and depends on a number of factors such as the particle size of the support and the composition of the growth preventive material. The powdery coating will tend to act as a barrier to gas transfer, and accordingly the amount of coating should not be so great that the rates of carbon deposition and carbon removal are unacceptably low. Furthermore, the amount of the powdery coating should be at least enough to substantially reduce and preferably eliminate the formation of carbon fibers during carbon deposition. The exact amount of coating to be used in a particular instance can be easily determined by routine experimentation. In a particularly preferred embodiment of the invention, the Group VIII metal is applied to the support in accordance with the above technique wherein the support is first impregnated with a compound containing the Group VIII metal, the support is heated in air to decompose the compound and produce an oxide of the Group VIII metal, and the support then heated in a reducing gas such as hydrogen to transform the oxide into elemental Group VIII metal. However, in this embodiment the growth preventive coating is applied before the final reduction step so that the growth preventing material is also subjected to severe reduction.

WORKING EXAMPLES

The following example is presented to more thoroughly illustrate the present invention.

EXAMPLE 28.5 gms. of an iron/Alundum catalyst comprising 90.5% ⅛ inch Alundum spheres impregnated with 9.5% iron was wetted with 2.77 gms. distilled water. The partially wetted impregnated support was then gently agitated with 1.5 gms. powdery $Cu_2O$ having a particle size of less than 50 mesh.

The resultant brick-red/brown spheres were used in carbon deposition and methanation. This was accomplished by charging the coated spheres into a ¼" O.D. fixed-bed reactor and contacting the spheres at 550° C. with $H_2/CO/N_2$ for carbon deposition. Thereafter, the spheres were contacted with a feed comprising $H_2/N_2$ at 550° C. for methanation.

After each carbon deposition step, a portion of the catalyst was examined by microscope and it was found that no carbon fibers were grown on the outside surfaces of the spheres.

COMPARATIVE EXAMPLE

The above example was repeated except that the iron impregnated Alundum catalyst was not provided with a $Cu_2O$ coating. After carbon deposition, carbon fibers were clearly visible on the outside surfaces of the catalyst spheres.

Although only a few embodiments of the invention have been illustrated above, many modifications can be made without departing from the spirit and scope of the invention. All such modifications are intended to be included within the scope of the present invention, which is to be limited only by the following claims:

We claim:

1. A catalytic material comprising a particulate fixed-bed support material, the pore surfaces of the support material being coated with a Group VIII metal, the outside surfaces of said support material being coated with a powdery carbon growth-preventing material capable of preventing growth on said outside surfaces of carbon fibers by the disproportionation of carbon monoxide under conditions in which carbon fibers grow on said Group VIII metal-coated pore surfaces.

2. The catalytic material of claim 1 wherein said growth preventing material is selected from the group consisting of copper oxide, copper metal, aluminum oxide and aluminum metal.

3. The catalytic material of claim 2 wherein said fixed-bed support material has a particle size of 1/32 inch to ¼ inch.

4. The catalytic material of claim 3 wherein said fixed-bed support is selected from the group consisting of silica, alumina, silica/alumina, zeolites, zirconia, titania, hafnia, silicon carbide, boron phosphate, diatomaceous earth and pumice.

5. The catalytic material of claim 4 wherein said fixed-bed support is silica/alumina.

6. The catalytic material of claim 4 wherein said catalytic material is made by
(1) wetting said support material with a liquid in an amount sufficient so that some of said liquid is absorbed on said support but not enough so that support particles are wet to the touch, and
(2) agitating said support particles in said powdery carbon growth-preventing material.

7. The catalytic material of claim 1 wherein said catalytic material is made by
(1) wetting said support material with a liquid in an amount sufficient so that some of said liquid is absorbed on said support but not enough so that support particles are wet to the touch, and
(2) agitating said support particles in said powdery carbon growth-preventing material.

* * * * *